United States Patent [19]

Betts

[11] 4,439,893
[45] Apr. 3, 1984

[54] SPRING CAM FOR SHRIMP CLAMP

[75] Inventor: Edmund D. Betts, Libertyville, Ill.

[73] Assignee: Gregor Jonsson Associates, Inc., Highland Park, Ill.

[21] Appl. No.: 296,529

[22] Filed: Aug. 26, 1981

[51] Int. Cl.³ .............................................. A22C 29/02
[52] U.S. Cl. ......................................... 17/72; 269/229
[58] Field of Search .................. 17/71, 72, 73, 48, 70; 83/379; 269/229, 254 CS

[56] References Cited

U.S. PATENT DOCUMENTS 2,789,309 4/1957 Yanus et al. ............................ 17/72
3,751,766 8/1973 Jonsson ................................. 17/71

Primary Examiner—Willie G. Abercrombie
Attorney, Agent, or Firm—Merriam, Marshall & Bicknell

[57] ABSTRACT

There is disclosed a shrimp processing machine which includes a new and improved cam arrangement for splitting the shrimp shells open to thereby expose the sand vein of the shrimp to facilitate the deveining of the shrimp and ultimate separation of the shrimp meat from the shrimp shells. The machine includes a plurality of processing stations including a cutting station for cutting the shrimp lengthwise through the shrimp shells along the shrimp sand veins and an adjacent deveining station for removing the sand vein of the shrimp. A carrier means transfers the shrimp through the processing stations and includes cam actuated clamp means for gripping the shrimp shells. A cam means disposed between the cutting and deveining stations is arranged to controllably act upon the clamp means of the carrier to cause an increase in the grip pressure on the shrimp by the clamp means after the shrimp have been cut for splitting the shrimp shells open to thereby expose the sand vein of the shrimp to the deveining stations. In the disclosed preferred embodiment, the cam means includes a pair of cam members which are arranged for relative pivotal movement and biased apart by a spring. Each of the cam members includes a cam surface which act upon the clamp means for increasing the pressure on the shrimp shells to split the shrimp shells open. By virtue of the spring biasing between the cam members, a maximum predetermined pressure is exerted upon the shrimp regardless of the size of the shrimp.

18 Claims, 6 Drawing Figures

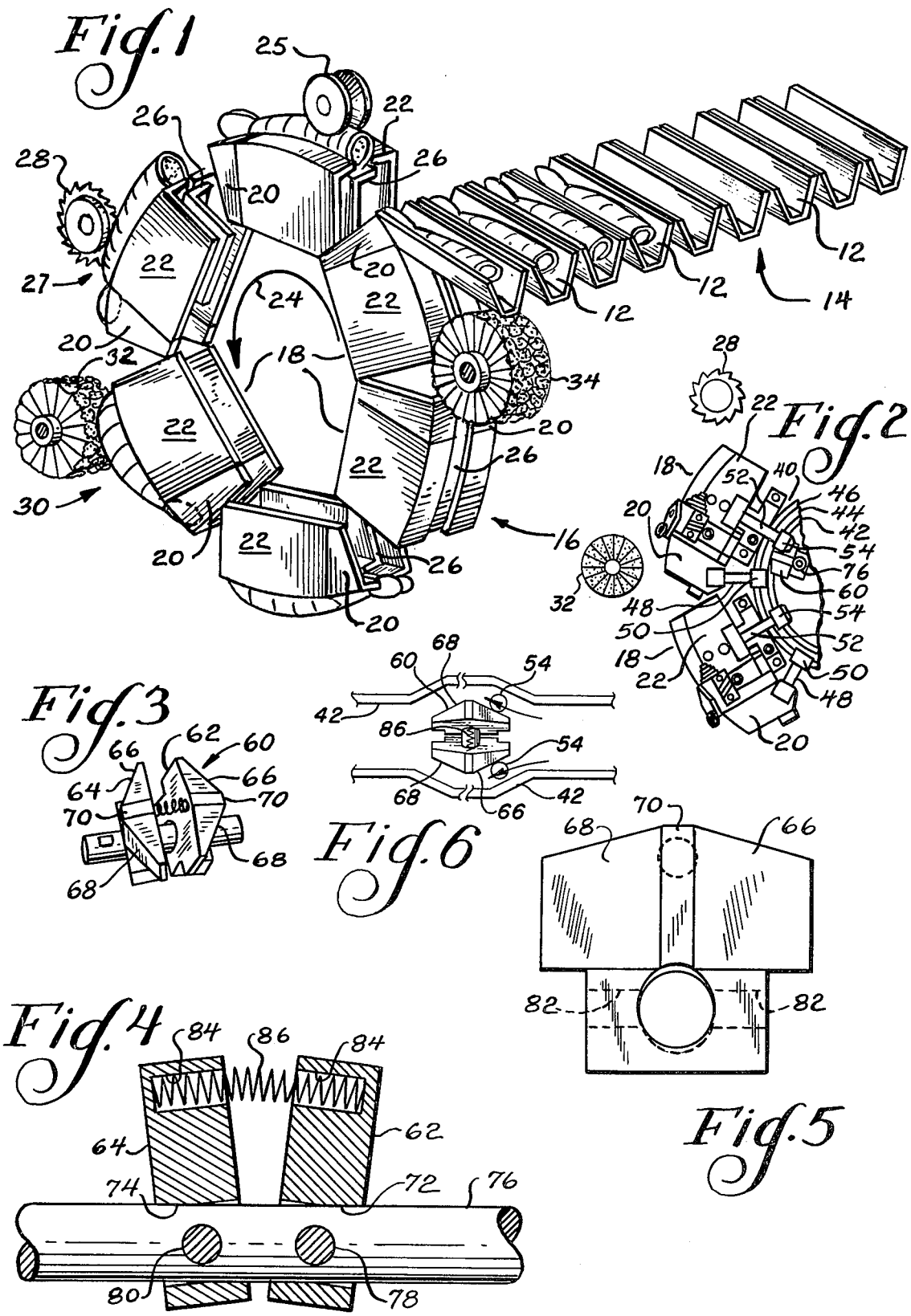

SPRING CAM FOR SHRIMP CLAMP

BACKGROUND OF THE INVENTION

The present invention is generally directed to the processing of food, and more particularly to a machine for cleaning shrimp.

The edible portion of a shrimp is covered with a shell and contains an inedible sand vein near its back. This vein must be removed before a shrimp is canned, frozen, or cooked and it is also desirable to remove the shrimp meat from the shell.

Hand removal of veins and hand shelling is tedious and inefficient and consequently is most undesirable when large numbers of shrimp must be handled. Many shrimp are seined from water in hot climates and the shrimp must be promptly processed in very large numbers. In order to reduce the required amount of hand work for removing the veins from shrimp and separating the meat and shells, various forms of shrimp cleaning machines have been devised. Machines of this type are fully described and claimed, for example, in U.S. Pat. Nos. 2,850,761; 3,159,871; 3,214,789; 3,238,561; and 3,751,766. The machines disclosed in those patents generally include a carrier comprising a plurality of circularly arranged clamps which grip the shrimp and transfer the shrimp along a circular path through various processing stations which clean the shrimp and separate the shrimp meat from the shrimp shells. During the cleaning of the shrimp, the machine cuts the shrimp lengthwise along the shrimp sand veins, and, rakes debris from the sand vein area of the shrimp to assure thorough removal of all material previously in the sand vein.

Each of the circularly arranged clamps includes a pair of clamp jaws which are mounted for relative pivotal movement. Springs acting between the clamps close the jaws and suitably positioned cams open them. As the clamps revolve in a circular direction to transfer the shrimp through the various processing stations of the machine, the clamps are held open by a ring cam disposed within the inner periphery of the clamps, and subsequently are spring-closed for gripping the shrimp shells.

The clamps are closed by springs coiled inside the clamp as shown, for example, in U.S. Pat. Nos. 2,850,761 and 3,214,789. The ring cams then allow the clamps to open and close at the desired location as shown in the patents. Ideally the clamps should close sufficiently to make the meat and shell tight such that when the cutter splits the shell open, the meat is released and allowed to spread open to expose the vein cavity.

The springs have to be very strong because some shrimp are very firm and have bulky portions or are of a semi rigid structure. But if soft meat and/or brittle shell is run through the shrimp processing machine then the shell will crack along the edge of the clamp and release the load on the meat due to the force exerted on the shell such that there is no blossom affect after a cutting operation and the vein is not properly exposed.

This invention allows a very light spring to initially close the clamps sufficiently during the cutting operation subsequently the spring biased cam of the present invention serves to close the clamps the rest of the way to permit blossoming of the meat and exposure of the shrimp vein. The cam must be positioned between the cutting and deveining station.

In order for the deveining of the shrimp to be successful, it is necessary for the sand vein of the shrimp to be exposed to the deveining process stations. Because there are a variety of different species of shrimp, each having shells of various thicknesses, the prior art machines have not always been able to expose the sand vein to the deveining stations through the cutting of the shrimp shells lengthwise along the sand vein and by the normal gripping of the shrimp shells by the clamps for transferring the shrimp. One species of shrimp in particular, known as Australian shrimp, have tough membranes and a brittle shell and thus, are particularly difficult to open for exposing the sand vein. Machines of the prior art have not always been capable of fully exposing the sand vein of this variety of shrimp and others to facilitate deveining of the shrimp.

It is therefore a general object of the present invention to provide a new and improved shrimp processing machine.

It is a further object of the present invention to provide a shrimp processing machine includes an improved cam arrangement which acts upon shrimp carrier clamps to cause the clamps to apply forces on the shrimp shells to permit the desired of splitting the shrimp shell and the exposing of the sand vein of the shrimp for subsequent removal.

It is a still further object of the present invention to provide such a shrimp processing machine in which an improved cam arrangement is arranged to cause the carrier clamps to exert an increased maximum predetermined force or pressure on the shrimp after the splitting of the shrimp shells along the sand vein in the cutter station. The cam arrangement is further arranged for positively returning the clamps to an initial operative position.

The invention therefore provides a machine for processing shrimp comprising carrier means including spring actuated clamp means for gripping the shrimp and transferring the shrimp through the machine, first cam means for causing the clamp means to open to receive the shrimp, and second cam means for causing the clamp means to exert an additional force on the shrimp for splitting the shells of the shrimp open. The second cam means includes a pair of spaced apart cam members arranged for pivotal movement relative to each other from an initial operative position, and biasing means for biasing the cam members apart to assure contact with the cam followers and return the cam members to their initial operative position.

BRIEF DESCRIPTION OF THE DRAWINGS

The features of the present invention believed to be novel are set forth with particularity in the appended claims. The invention, together with further objects and advantages thereof, may best be understood by making reference to the following description, taken in conjunction with the accompanying drawings, in the several figures of which like reference numerals indicate identical elements, and wherein:

FIG. 1 is a perspective view, partially in schematic form, of a shrimp processing machine adapted to embody the present invention;

FIG. 2 is a partial side elevational view of the machine of FIG. 1 illustrating the cam arrangement embodying the present invention in greater detail;

FIG. 3 is a perspective view of the cam arrangement embodying the present invention;

FIG. 4 is a side view, partly in cross section, of the cam arrangement of FIG. 3;

FIG. 5 is an end plan view of the cam members of the cam arrangement of FIG. 3; and, FIG. 6 is a plan schematic view of the cam arrangement of the present invention engaged by the body clamp rollers.

DESCRIPTION OF THE PREFERRED EMBODIMENT

Referring now to FIG. 1, there is shown in partially schematic perspective form the processing stations and shrimp carrier which transfers the shrimp through the various processing stations of the shrimp processing machine embodying the present invention. The apparatus illustrated in FIG. 1 may be, preferably, incorporated into a shrimp cleaning machine as fully illustrated and described in the aforementioned U.S. Pat. Nos. 2,850,761; 3,159,871; 3,214,789; 3,238,561; and 3,751,766, which patents are incorporated herein by reference.

The apparatus of FIG. 1 includes a plurality of trays 12 of a loading conveyor 14. The loading conveyor is intermittently operable and is stationary while the shrimp are manually deposited in the trays. The shrimp are positioned in the conveyor trays 12 so that the tails of the shrimp project outwardly therefrom. The conveyor 14 passes over a rotary or disc conveyor or carrier 16. The carrier 16 comprises a plurality of sets of clamps 18. The carrier 16 and conveyor 14 are operated in timed relation so that the shrimp, which are manually placed in the trays 12 of the conveyor 14, properly load into the carrier 16. Each set of clamps 18 comprises a tail clamp 20 and a body clamp 22. The tail clamps 20 and body clamps 22 in turn each comprise a pair of opposed clamp jaws which, as will be more fully described here-inafter, are spring actuated for gripping the shrimp. The direction of rotation of the carrier 16 is indicated by the arrow 24 such the tail clamps 20 lead the body clamps 22.

As the clamp sets ascend from beneath the conveyor trays 12, the clamp sets are opened by suitable cams. Each of the tail clamps closes opposite a conveyor tray 12, the loading conveyor being stationary at this time, to clamp the tail of a shrimp thereby to pull the shrimp from the conveyor tray. The bodies of the shrimp are pushed down part way into the spaces between the jaws of the body clamps 22 by a grooved roller 25 against a back-up plate 26 whereupon the body clamps 22 are closed. The underside or belly of a shrimp is provided with a number of appendages and is rather soft. The underside or belly is thereby pinched or clamped between the clamps 22.

Continued rotation of the carrier 16 transfers the shrimp to a processing station 27 which cuts the shrimp lengthwise along the shrimp sand veins. To that end, the shrimp cutting station includes a rotating knife 28 which slits the shell of the shrimp down the back and into the meat of the shrimp in the area of the shrimp sand vein.

After passing the shrimp cutting station, the cam arrangement embodying the present arrangement causes the body clamps 22 to further pinch and apply an additional force to the shrimp shells to cause the shrimp shells to spread apart along the slit provided by the rotating knife 28. As will be more fully described hereinafter, the cam arrangement causes the body clamps 22 to apply an increased maximum predetermined pressure to the shrimp shells to assure that the shrimp shells are split apart to expose the sand vein to the deveining station 30.

Continued rotation of the carrier 16 transfers each shrimp past a brush 32 of the deveining station 30. The brush 32 rakes the sand vein and other debris of the shrimp for cleaning the shrimp along the sand vein thereof. Complete cleaning of the sand vein area of the shrimp is assured by virtue of the fact that the cam arrangement of the present invention to be described in greater detail hereinafter spreads the shells of the shrimp apart to an extent which fully exposes the sand vein area of the shrimp to the deveining station 30.

Continued rotation of the carrier 16 transfers each shrimp into position above a meat separating station (not shown). The meat separating station may include a plurality of spike members which are arranged for vertical reciprocal movement. The spike members move up in timed relation to the movement of the carrier 16 and at a very rapid rate to penetrate the meat of the shrimp without tearing the meat. The carrier then moves with the meat impaled on the spike members so that the body clamps 22 pull the shell away from the meat.

The spike members are then retracted and the separated meat is released. A water spray then moves the meat away from the separating station for collection.

The shells of the shrimp are carried beyond the end of the meat separating station to be dropped for collection. Also, a rotating brush 34 is positioned adjacent the periphery of the carrier 16 for cleaning the clamps 18.

Referring now to FIG. 2, there it can be seen that the clamps 18 of the carrier 16 revolve about an inner ring structure 40 which includes a plurality of circumferential cam surfaces 42, 44, and 46. The tail clamps 20 each include cam actuated arms 48 which carry rollers 50. The rollers 50 as shown, for example, in the prior art U.S. Pat. No. 3,238,561, FIGS. 4, 5, are arranged to engage the cam surface 46 to open the clamps to receive the shrimp and thereafter to permit springs to cause the tail clamps to close and clamp the tail portions of the shrimp.

In a similar manner, each of the jaws of the body clamps 22 include a cam actuated arm 52 extending therefrom which terminate in rollers 54. The rollers 54 are arranged to engage the cam surface 42 which may be referred to as a first cam means. As shown in the prior art patents, e.g. U.S. Pat. No. 3,238,561, the cam surface 42 act in concert with springs to permit the arms 52 to open the jaws of the shell of the body portions of the shrimp to be deposited in the clamp.

Referring to FIGS. 2 and 6, it will be observed that between the rotary blade 28 and the deveining station 30 of the machine of FIG. 1 (somewhat above a 9 o'clock position, closer to blade 28 than to brush 32), there is disposed the cam arrangement 60 embodying the present invention. The cam arrangement 60 is arranged to be engaged by the rollers 54 of the body clamp cam actuated arms 52 to cause the body clamps 22 to further close and exert an additional force upon the shrimp shells to separate or split the shrimp shells for exposing the sand vein area of the shrimp subsequent to being cut by the rotary blade 28.

Referring now to FIGS. 3-5, the cam arrangement 60 includes a pair of cam members 62 and 64. Each of the cam members includes a cam surface having an inclined cam surface portion 66, a declined cam surface portion 68, and an adjoining level cam surface portion 70. The cam arrangement 60 is disposed with respect to the rollers 54 of the body clamps 22 such that a respective one of the rollers 54 will engage a respective cam member cam surface. By virtue of the inclined cam surfaces 66 and declined cam surfaces 68, the cam arrangement 60 causes the clamps 22 to exert a gradually increasing and gradually decreasing pressure on the shrimp shells thus spreading the shells apart.

The cam members 62 and 64 each include a through bore 72 and 74 respectively. The bores 72 and 74 are dimensioned to receive a connecting rod member 76 which supports the cam arrangement 60 in the machine. The cam members 62 and 64 are mounted on the rod member 76 in spaced relation by pins 78 and 80 within the bores 72 and 74. The pins 78 and 80 extend through bores 82 which are generally perpendicular to the bores 72 and 74.

The cam members 62 and 64 are also mounted on the rod member 76 for pivotal movement relative to each other. To that end, it is noted, that the bores 72 and 74 are tapered to allow the cam members 62 and 64 to pivot toward and away from one another. Also, be virtue of the taper of the bore 72 and 74, the degree of pivotal movement of the cam members 62 and 64 is limited.

The cam members 62 and 64 also include bores 84. The bores 84 face each other and receive a coiled spring 86. The coil spring 86 thereby extends across and between the cam members 62 and 64 to bias the cam members apart in an initial operative position as shown in FIG. 4. The utilization of the cam portions 62, 64 and spring 86 permits the processing of shrimp of different sizes in the machine and further, they accommodate manufacturing tolerances of the clamp and cam components. When the cam members are in an initial operating position, the distance between level cam surface portions 70 is somewhat greater than the distance between rollers 54 when the clamp jaws 22 are fully closed. Also, the degree of incline of cam surface portions 66 from the level surface 70 is selected such that the distance between the leading edges of the cam portions 62, 64 will be less than the distance between rollers 54 when jaws of the body clamps 22 are held partially open by the largest shrimp that the machine will process. The stiffness of spring 86 is great enough to completely close the clamp jaws 22 even with large, firm shrimp, yet small enough to allow the cam members to pivot toward each other after the clamp is fully closed without bending arms 52. Spring 86 also serves to return the cam members 62 and 64 to their initial operative position as shown in FIG. 4 after the rollers 54 of the body clamps 22 have passed thereby.

From the foregoing, it can be appreciated that the present invention provides a new and improved shrimp processing machine. The cam arrangement 60 causes the body clamps 22 to exert an additional force on the shrimp shells as the shrimp are transferred from the cutting blade 28 to the deveining station 30 for separating the shrimp shells to expose the sand vein of the shrimp to an extent which assures that the sand vein area of the shrimp will be totally exposed to the deveining station.

While a particular embodiment of the present invention has been shown and described, modifications may be made, and it is therefore intended to cover in the appended claims all such changes and modifications as fall within the true spirit and scope of the invention.

The invention is claimed as follows:

1. A shrimp processing machine comprising: a plurality of processing stations including a cutting station for cutting the shrimp lengthwise through the shrimp shells along the shrimp sand veins, and an adjacent deveining station for removing the sand vein of the shrimp; carrier means for transferring the shrimp through the processing stations, said carrier means including cam actuated clamps means for gripping the shrimp shells; and cam means between said cutting and said deveining stations arranged to controllably act upon said clamp means to cause an increase in pressure on the shrimp by said clamp means between said cutting and deveining stations for splitting the shrimp shells open to thereby expose the sand vein of the shrimp to the deveining station.

2. A machine as defined in claim 1 wherein said clamp means comprises a pair of clamp jaw arranged for relative pivotal movement, each of said jaws carrying a cam actuated arm for closing said jaws, and wherein said cam means includes a pair of cam members each having a cam surface arranged to engage a respective one of said arms for causing said clamp means to increase pressure upon the shrimp.

3. A machine as defined in claim 2 wherein said cam members are arranged for pivotal movement relative to each other, wherein said cam means includes spring means, and wherein said spring means is disposed between said cam members for biasing said cam members apart to cause said clamp jaws to exert a controlled predetermined increased pressure on the shrimp.

4. A machine as defined in claim 3 wherein said spring means comprises a coiled spring extending between said cam members.

5. A machine as defined in claim 3 wherein said cam members each include a through bore, wherein said cam means includes a rod member extending through said bores, and wherein said cam members are pivotally mounted to said rod member in spaced apart relation within said bores.

6. A machine as defined in claim 5 wherein said bores are tapered to limit the extent of relative pivoting of said cam members.

7. A machine as defined in claim 2 wherein each said cam surface includes an inclined surface and a declined surface.

8. A machine for processing shrimp comprising: carrier means including cam actuated clamp means for gripping the shrimp and transferring the shrimp through said machine; first cam means for causing said clamp means to grip the shrimp; and second cam means for causing said clamp means to exert an additional force on the shrimp for splitting the shells of the shrimp open, said second cam means including a pair of spaced apart cam members arranged for pivotal movement relative to each other from an initial operative position and biasing means for biasing said cam members apart.

9. A machine as defined in claim 8 wherein each said cam member includes an inclined cam surface and a declined cam surface.

10. A machine as defined in claim 9 wherein each said cam member includes a through bore, wherein said second cam means includes a rod member extending through said bores, and wherein said cam members are pivotally mounted to said rod member within said bores.

11. A machine as defined in claim 10 wherein said bores are tapered for limiting the extent of relative pivoted movement of said cam members on said rod members.

12. A machine as defined in claim 11 wherein said biasing means includes a coiled spring extending between said cam members.

13. A cam arrangement for use in a shrimp processing machine of the type having a carrier including a cam actuated clamp means for gripping the shrimp, said cam arrangement comprising: a pair of cam members arranged for relative pivotal movement and each having a cam surface thereon; mounting means for mounting said cam members in spaced apart relation, and biasing means for biasing said cam members apart in an initial operative position.

14. A cam arrangement as defined in claim 13 wherein said mounting means includes a through bore within each said cam member, a rod member extending through said bores, and pivot means for pivotally mounting said cam members to said rod member within said bores.

15. A cam arrangement as defined in claim 14 wherein said biasing means comprises a coiled spring extending between said members.

16. A cam arrangement as defined in claim 14 wherein said bores are tapered for limiting the relative pivotal movement of said cam members.

17. A cam arrangement as defined in claim 14 wherein each said cam member includes an inclined cam surface and a declined cam surface.

18. A cam arrangement for use in a shrimp processing machine of the type having a carrier including a cam actuated clamp means for gripping the shrimp, said cam arrangement comprising: a pair of cam members having yieldable cam surfaces thereon; mounting means for mounting said cam members in spaced apart relation, and means for biasing said cam members apart in an initial operative position.

* * * * *

UNITED STATES PATENT AND TRADEMARK OFFICE
CERTIFICATE OF CORRECTION

PATENT NO. : 4,439,893
DATED : April 3, 1984
INVENTOR(S) : E. Douglas Betts

It is certified that error appears in the above-identified patent and that said Letters Patent are hereby corrected as shown below:

Col. 1, line 66, following "operation" insert --.--;

Col. 1, line 66, delete "subsequently" insert --Subsequently,--;

Col. 2, line 26, following "desired" delete --of--;

Col. 2, line 26, following "splitting" insert --of--;

Col. 4, line 50, following "of the" insert --body clamps 22 to cause the--.

Signed and Sealed this

Tenth Day of July 1984

[SEAL]

Attest:

GERALD J. MOSSINGHOFF

Attesting Officer

Commissioner of Patents and Trademarks